June 19, 1923.
L. F. O'FLAHERTY ET AL
1,459,243
VALVE
Filed March 31, 1922     2 Sheets-Sheet 1
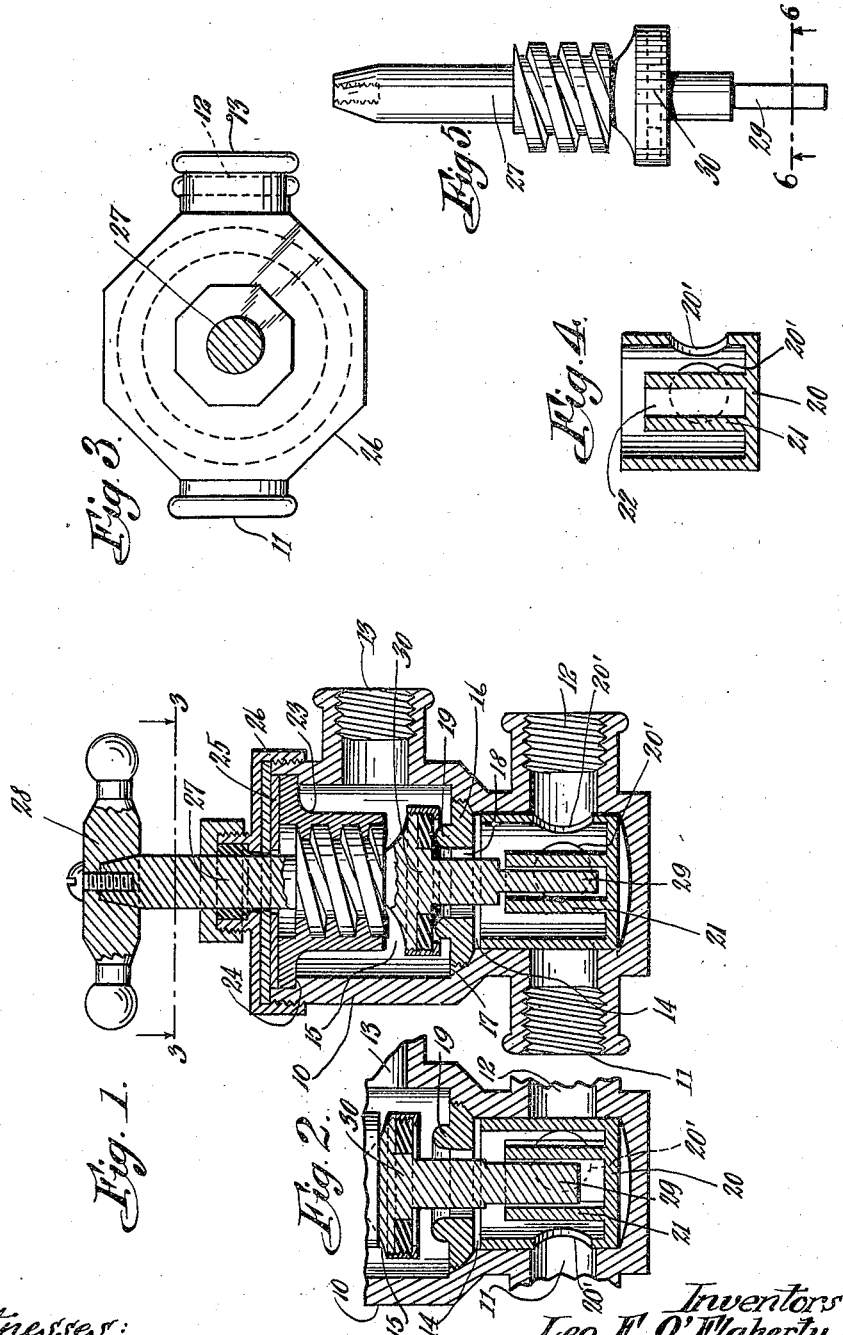
Witnesses:
Inventors
Leo F. O'Flaherty &
William L. Kirkpatrick
By Joshua R H Potts
Their Attorney June 19, 1923.

L. F. O'FLAHERTY ET AL

VALVE

Filed March 31, 1922     2 Sheets-Sheet 2

1,459,243

Witnesses
Berthold Oblatt
H. S. Weidman

Inventors
Leo F. O'Flaherty &
William L. Kirkpatrick
By Joshua R. H. Potts
Their Attorney Patented June 19, 1923.

1,459,243

UNITED STATES PATENT OFFICE.

LEO F. O'FLAHERTY AND WILLIAM L. KIRKPATRICK, OF ELGIN, ILLINOIS.

VALVE.

Application filed March 31, 1922. Serial No. 548,334.

*To all whom it may concern:*

Be it known that we, LEO F. O'FLAHERTY and WILLIAM L. KIRKPATRICK, citizens of the United States, and residents of the city of Elgin, county of Kane, and State of Illinois, have invented certain new and useful Improvements in Valves, of which the following is a specification.

This invention relates to valves, and more particularly to valves for mixing hot and cold water, or other fluids, and has for its object the provision of a valve having means for actuating the same, said actuating means being independently operable to seal said mixing valve.

Other objects will appear hereinafter.

The invention consists in the combinations and arrangements of parts hereinafter described and claimed.

The invention will be best understood by reference to the accompanying drawings forming a part of this specification, and in which, Fig. 1 is a vertical sectional view of the invention, showing the same in inoperative or sealed position.

Fig. 2 is a fragmentary vertical sectional view of the invention showing the same in one operative position, the sealing means being unseated to permit the passage of fluid therepast.

Fig. 3 is a view, partly in section, on the line 3—3 of Fig. 1,

Fig. 4 is a detail sectional view of the mixing valve proper.

Fig. 5 is a detail view of the sealing valve, mounted on the mixing valve operating means.

Figure 7:
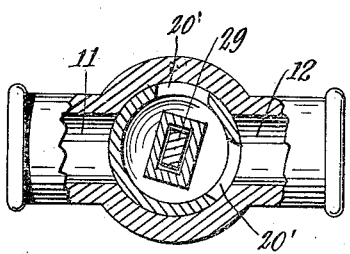
Fig. 7 is a fragmentary sectional view showing one relative position of the mixing valve.
Figure 6:
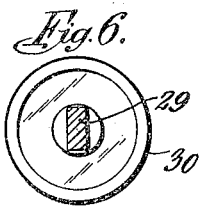
Fig. 6 is a sectional view on line 6—6 of Fig. 5.
Figure 8:
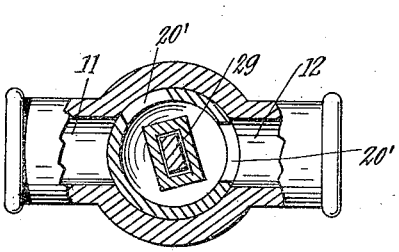
Fig. 8 is a similar view showing another position of the mixing valve when the same has been rotated a small distance in an anti-clockwise direction.
Figure 9:
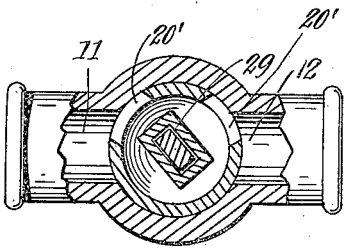
Fig. 9 is a similar view showing the position assumed by the valve on further anti-clockwise rotation.
Figure 10:
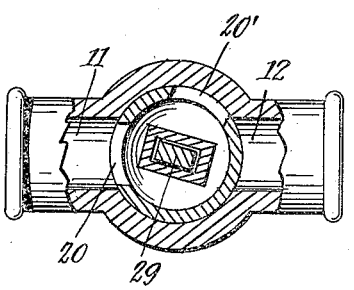
Fig. 10 is a similar view showing the position assumed by the valve on still further anti-clockwise rotation.

The invention comprises a casing 10, preferably having inlet ducts 11 and 12, and an outlet duct 13. Such casing is preferably divided into a mixing chamber 14, and a discharge chamber 15, by means of a partition 16, threaded into shoulders 17, on the inner periphery of the casing 10, the partition 16 preferably being provided with an aperture 18, such aperture preferably being surrounded by an annular rib 19, as shown.

Preferably rotatably mounted in the mixing chamber 14, is a cup-shaped valve 20 having suitable ports 20' in its periphery, as shown, such valve also preferably being provided with an upstanding boss 21, such boss preferably having therein an angular bore 22.

Mounted in the discharge chamber 15 is a threaded bearing member 23, such bearing member preferably being supported on shoulders 24 in the interior of the casing 10. Washers 25 are preferably disposed upon the bearing member 24, and such washers and said bearing member are held in position by means of a cap 26 threaded onto the casing 10, as shown.

Threaded into the bearing member 24 is a stem 27, the outer end of which carries a handle 28 for rotating the same, and the inner end 29 of which is preferably reduced and shaped to slidably project into the boss 21, as shown. A sealing valve 30 is preferably mounted on the stem 27 as shown, and in the innermost position of said stem is adapted to rest upon and snugly engage the rib 19 on the partition 16.

By this arrangement, when the stem 27 is rotated, such rotation is transmitted to the cup-shaped valve 20 in order to mix fluids entering the chamber 14 through the inlets 11 and 12, the rotatable movement of such stem serving to lift the sealing valve 30 off its seat, to permit the passage of fluid through the aperture 16 and thence from the outlet 13. It will be noticed that but approximately a quarter of a revolution of the stem 27 and valve 21 is necessary to successively bring one of the ports 20' into registration with one of the inlets, then with both of the inlets and then with the other of said inlets, thereby closing said first-mentioned inlet. This movement also raises the sealing valve the greatest distance from its seat. Rotation of the stem in opposite direction of course effects a reverse operation of the valve.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention, what we claim as new and desire to secure by Letters Patent is:

1. A mixing device comprising a casing; a partition dividing said casing into communicating mixing and discharge chambers; a mixing valve in said mixing chamber having an angular socket therein; a stem mounted for sliding movement in said socket, and adapted to impart rotation thereto; and a sealing valve in said discharge chamber mounted on and movable with said stem.

2. A mixing device comprising a casing; a partition dividing said casing into communicating mixing and discharge chambers; a mixing valve in said mixing chamber having an angular socket therein; a rotatable stem mounted for longitudinal movement, having its end slidably but non-rotatably engaging said socket, whereby rotation of said stem causes longitudinal movement thereof and rotation of said valve; and a sealing valve in said discharge chamber mounted on and movable with said stem.

3. A mixing device comprising a casing; a partition dividing said casing into mixing and discharge chambers and having an aperture therein; a valve mounted in said mixing chamber for rotative movement only; means longitudinally movable adapted to rotate said valve; and sealing means in said discharge chamber and mounted on said longitudinally moving means for closing said aperture.

4. A mixing device comprising a casing; a partition dividing said casing into communicating mixing and discharge chambers; a mixing valve in said mixing chamber and capable of rotative movement alone; means mounted in said discharge chamber and projecting into said mixing chamber adapted to rotate said valve; and sealing means in said discharge chamber mounted on and movable with said rotatable means and adapted to close the communication between said chambers.

5. A mixing device comprising a casing; a partition dividing said casing into communicating mixing and discharge chambers; a mixing valve rotatably mounted in said mixing chamber; a stem mounted in said discharge chamber and projecting into said mixing chamber adapted to slidably engage said mixing valve and rotate same; and a sealing valve in said discharge chamber mounted on and moving with said stem and adapted to close the communication between said chambers.

6. A mixing device comprising a casing; a partition dividing said casing into communicating mixing and discharge chambers; a cup-shaped valve having mixing ports in its periphery; a central boss in said valve; a stem mounted in said discharge chamber and slidably and non-rotatably engaging said boss; and a sealing valve in said discharge chamber mounted on and movable with said stem for closing the communication between said chambers.

7. A mixing device comprising a mixing chamber; a mixing valve mounted in said chamber for rotative movement only; means projecting into said mixing chamber for operating said valve, and being so arranged that rotation of said means rotates said valve, and simultaneously causes said means to travel longitudinally; and means upon said operating means adapted to open and close said mixing chamber during the travel of said operating means.

8. A mixing device comprising a casing having mixing and discharge chambers; a mixing valve mounted in said mixing chamber for rotative movement only; means mounted in said discharge chamber and projecting into said mixing chamber and adapted to rotate said valve; and sealing means in said discharge chamber mounted on and movable with said rotatable means and adapted to close communication between said chambers.

9. A mixing device comprising communicating mixing and discharge chambers; a bearing in said discharge chamber; a mixing valve in said mixing chamber; a stem threaded in said bearing and slidably but non-rotatably engaging said mixing valve; and a sealing valve mounted on and movable with said stem and adapted to close communication between said chambers.

10. A mixing device comprising communicating mixing and discharge chambers; a bearing in said discharge chamber; a cup-shaped mixing valve in said mixing chamber, said valve having a central boss therein; a stem threaded in said bearing and slidably and non-rotatably engaging said boss; and a sealing valve mounted on and movable with said stem to close the communication between said chambers.

In testimony whereof we have signed our names to this specification in the presence of two subscribing witnesses.

LEO F. O'FLAHERTY.
WILLIAM L. KIRKPATRICK.

Witnesses:
JOSHUA R. H. POTTS,
FREDA C. APPLETON.